July 30, 1963 L. W. SPIRO 3,099,054
FLEXIBLE MULTI-PURPOSE CLAMP
Filed April 24, 1961
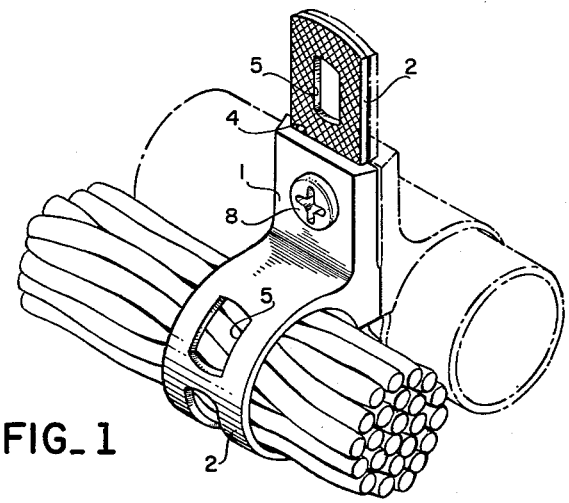
FIG_1
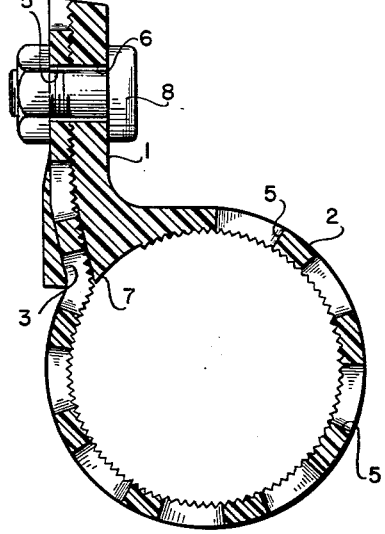
FIG_2
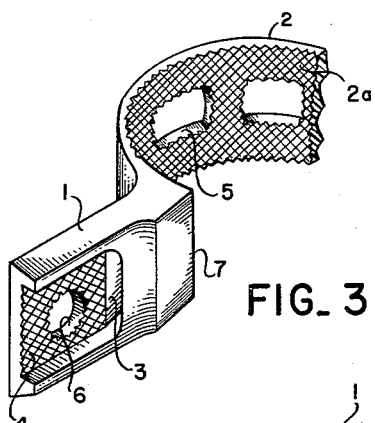
FIG_3
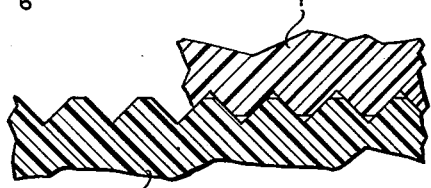
FIG_4
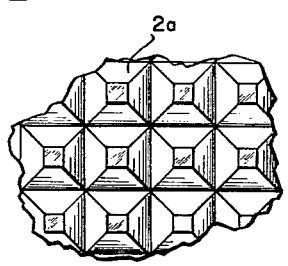
FIG_5
INVENTOR.
LLOYD W. SPIRO
BY
*George C. Sullivan*
Agent

United States Patent Office 3,099,054
Patented July 30, 1963

3,099,054
FLEXIBLE MULTI-PURPOSE CLAMP
Lloyd W. Spiro, Canoga Park, Calif., assignor to Lockheed Aircraft Corporation, Burbank, Calif.
Filed Apr. 24, 1961, Ser. No. 104,979
1 Claim. (Cl. 24—16)

This invention relates to an improved flexible clamp for general utility for pipe, tubing, wiring, conduit and the like, which clamp is capable of accommodating various sizes of retained material.

Various types of metallic and non-metallic, rigid and flexible clamps or hangers have been utilized in the past. Each of the known clamps has had inherent limitations as to general use. Furthermore, in the flexible clamps to which this invention particularly relates, the conventional clamps are of various sizes, which creates a stock problem. Adjustable clamps are not particularly suited to wiring which is not enclosed in a conduit, either causing serious abrasion of the wires or a non-uniform distorted group of wires.

It is accordingly an object of the invention to provide a flexible one-piece multi-purpose clamp.

Another object of the invention is to provide a light and easily-installed clamp of the non-metallic type.

Another object of the invention is to provide a flexible non-metallic clamp wherein one size of clamp will hold a variety of sizes of pipe, conduit or wiring.

Another object of the invention is to provide an all-purpose flexible clamp which is adjustable to various sizes of wire bundles and without abrasion of the wires.

A further object of the invention is to provide a multi-purpose flexible clamp for holding pipes, conduits, wiring, which clamp may be attached to bulkheads or other supports or adaptable as hangers.

Other and further important objects of this invention will become apparent from the following description and the accompanying drawings, in which:

FIGURE 1 is a perspective view of a clamp embodying the features of this invention and illustrating the multi-purpose function as a clamp for wiring or pipes.

FIGURE 2 is a cross-section of the clamp in the operative or installed condition.

FIGURE 3 is a perspective of the slotted base portion of the invention.

FIGURE 4 is a cross-section of the mating surfaces of FIGURE 2 illustrating important details thereof.

FIGURE 5 is an enlarged plan view of the knurled surfaces of the strap and base portions of the invention.

Referring to FIGURES 1 and 2, the one-piece clamp is shown as having a base portion 1 and a strap portion 2. The base contains a slot 3 which extends partially through the base adjacent the strap, and into which the free end of the strap is inserted. The slot 3 joins a U channel 4 which extends the remainder of the length of the base. The inner circumference of the strap and the bottom of the U channel are diamond knurled as illustrated at 2a. The diamond knurl is preferably on the diagonal to the strap axis, as illustrated in FIGURES 1 and 3. Elongated holes, or perforations 5, are provided in the strap and a preferably round perforation or hole 6 is provided in the base.

Between the slot 3 and the junction of the strap and base portions, there is provided a wedge 7. The slotted side of the wedge is preferably left free of the knurl to facilitate insertion of the strap.

As noted in FIGURE 2, the wedge 7 acts in conjunction with the strap to provide symmetrical support for an enclosed bundle of wires, conduit or the like. This feature makes it possible to firmly and uniformly support wire bundles in a neat and yet tight cross-section.

As shown in FIGURES 4 and 5, the knurl is preferably made on all surfaces in a uniforma manner to provide for mating engagement between the strap and channel area. The peaks of the knurl are removed as indiacted in FIGURE 4 to prevent abrasion of the wires or soft conduit.

The clamp is installed very readily by looping the strap around the conduit or wire bundle, inserting the end of the strap through the slot and cinching the strap snugly around the object to provide coincidence of the hole 6 and one of the holes 5. The elongated holes provide for infinite variance in the inside diameter of the strap. A fastening means such as the screw or bolt 8 is used to hold the base and strap in intimate contact with each other, either against a supporting structure or for attaching two clamps together as a hanger in FIGURE 1.

The diagonally knurled surfaces are preferably made on the inside of the strap and the bottom of the channel to provide holding or bearing surfaces in addition to the fastening means 8. It is readily seen that once the end of the strap has been inserted in the wedge slot and the mating knurled surfaces are drawn up into intimate contact with each other the major component of force along the strap is absorbed by the multi-faceted knurls. This feature permits temporary retention of the clamp in place on the conduit or wire bundle prior to actual mounting of the strap. Side forces which normally cause twisting at the bolt or screw 8 are also absorbed, thereby eliminating the tendency of the object held by the strap to rotate axially or longitudinally.

Thus it is readily apparent that the described invention provides a multi-purpose reusable clamp, preferably made of a non-conducting and non-absorptive substance, and which eliminates substantially all of the disadvantages of known clamps and which includes many advantages not heretofore possible.

I claim:

A tubing or wiring supporting clamp comprising, a flexible strap having through perforations along its length and a base integrally attached thereto, said base having opposed upper and lower walls interconnected along their sides to form a through opening or slot having smooth walled surfaces adjacent the junction of the strap and base and adapted to receive the end of said strap, a U-shaped channel at the other end of said base and adjoining said slot, said channel having a through perforation for registry with a selected perforation of said strap, diamond knurled surfaces on the bottom of said channel and on the mating surface of the strap and means including said perforations for holding the knurled surfaces in intimate contact.

References Cited in the file of this patent

UNITED STATES PATENTS

| 277,431 | Smith | May 8, 1883 |
|---|---|---|
| 2,421,443 | Torresen | June 3, 1947 |
| 2,929,596 | Ewing | Mar. 22, 1960 |
| 2,979,794 | DeBartolo | Apr. 18, 1961 |

FOREIGN PATENTS

| 37,815 | France | Nov. 18, 1930 |
|---|---|---|
| 508,037 | Italy | Jan. 4, 1955 |
| 771,376 | Great Britain | Apr. 3, 1957 |
| 90,780 | Norway | Jan. 20, 1958 |